US009540154B2

(12) United States Patent
Vrijens et al.

(10) Patent No.: US 9,540,154 B2
(45) Date of Patent: Jan. 10, 2017

(54) CLOSURE FOR A CONTAINER AND METHOD FOR CARRYING OUT A FREEZE-DRYING PROCESS

(75) Inventors: Ronny Prosper Elisabeth Vrijens, Vliermaalroot (BE); Reinhard Louis Jozef Waeben, Hasselt (BE)

(73) Assignee: Datwyler Pharma Packaging International NV, Alken (BE)

( * ) Notice: Subject to any disclaimer, the term of this patent is extended or adjusted under 35 U.S.C. 154(b) by 551 days.

(21) Appl. No.: 13/697,094

(22) PCT Filed: May 6, 2011

(86) PCT No.: PCT/EP2011/057312
§ 371 (c)(1),
(2), (4) Date: Nov. 9, 2012

(87) PCT Pub. No.: WO2011/141376
PCT Pub. Date: Nov. 17, 2011

(65) Prior Publication Data
US 2013/0055681 A1 Mar. 7, 2013

(30) Foreign Application Priority Data
May 10, 2010 (DE) ........................ 10 2010 016 866

(51) Int. Cl.
*B65D 41/28* (2006.01)
*B65B 7/28* (2006.01)
(Continued)

(52) U.S. Cl.
CPC ............ *B65D 51/241* (2013.01); *A61J 1/1406* (2013.01); *A61J 1/1475* (2013.01); *B65D 47/247* (2013.01)

(58) Field of Classification Search
CPC ..... B65B 63/08; B65D 79/005; B65D 43/169; B65D 51/18; B65D 47/249; B65D 50/061; B65D 51/20; B65D 53/00; B65D 51/241; B65D 47/247; A61M 5/315; A61M 5/31; A61J 1/1475
See application file for complete search history.

(56) References Cited

U.S. PATENT DOCUMENTS 1,643,285 A 9/1927 Davis
1,949,058 A 2/1934 Leguillon
(Continued)

FOREIGN PATENT DOCUMENTS

CA 2 677 408 10/2008
DE 29 00 850 7/1980
(Continued)

OTHER PUBLICATIONS

International Search Report of PCT/EP2011/057312, Jun. 29, 2011.

*Primary Examiner* — Thanh Truong
*Assistant Examiner* — Thomas Wittenschlaeger
(74) *Attorney, Agent, or Firm* — Collard & Roe, P.C.

(57) ABSTRACT

A closure (1) for a container (9), or for an ampoule (9), in which a medicament is accommodated, having a closure cap (2) and a closure stopper (5) accommodated in the closure (2). Detent moldings (6) are formed on the closure cap (2) for latchingly holding the closure (1) on the ampoule (9), and a sliding part (3) is provided which is movable relative to the closure cap (2) in order to displace the closure stopper (5) into the closed position. In order to advantageously provide, with respect to carrying out a freeze-drying process, a closure for a container, or for an ampoule, in which a medicament is accommodated, the closure stopper (5) is displaceable relative to the cap (2) by means of the sliding part (3) in order to move the closure stopper into the closed position. There is also a method for carrying out a freeze-
(Continued)

drying process for a medium, or for a medicament, which is accommodated in a container, or in an ampoule (9).

25 Claims, 15 Drawing Sheets

(51) Int. Cl.
*B65D 51/24* (2006.01)
*A61J 1/14* (2006.01)
*B65D 47/24* (2006.01)

(56) References Cited

U.S. PATENT DOCUMENTS 4,060,911 A * 12/1977 Weiler .................... B65B 31/00 34/284
4,194,640 A 3/1980 Crankshaw et al.
5,314,084 A * 5/1994 Folta et al. ................... 215/249
5,604,101 A * 2/1997 Hanley ............... B01L 3/50825 435/6.16
5,732,837 A * 3/1998 Jones ............................ 215/311
5,899,349 A * 5/1999 Moore ................ B01L 3/50825 215/277
5,901,866 A * 5/1999 Storar ........................... 215/249
2001/0009243 A1* 7/2001 Browne ............... B65D 55/024 215/249
2005/0178462 A1* 8/2005 Py ......................... A61J 1/1412 141/2
2006/0278603 A1* 12/2006 Takashima ............ B29C 45/006 215/349
2009/0001042 A1* 1/2009 Sever ..................... B65D 41/28 215/248
2010/0050575 A1 3/2010 Aneas
2010/0089862 A1* 4/2010 Schmitt ................ B65D 51/241 215/249

FOREIGN PATENT DOCUMENTS

| | | |
|---|---|---|
| FR | 2 036 746 | 12/1970 |
| FR | 2 674 508 | 10/1992 |
| WO | WO 01/49583 | 7/2001 |
| WO | WO 2005/000703 | 1/2005 |
| WO | WO 2008/129144 | 10/2008 |
| WO | WO 2009/070819 | 6/2009 |

* cited by examiner

CLOSURE FOR A CONTAINER AND METHOD FOR CARRYING OUT A FREEZE-DRYING PROCESS

CROSS REFERENCE TO RELATED APPLICATIONS

This application is the National Stage of PCT/EP2011/057312 filed on May 6, 2011, which claims priority under 35 U.S.C. §119 of German Application No. 10 2010 016 866.1 filed on May 10, 2010, the disclosure of which is incorporated by reference. The international application under PCT article 21(2) was not published in English.

The invention relates in first instance to a closure for a container, for example an ampoule, in which preferably a medicament is accommodated, having a closure cap and a closure stopper accommodated in the closure, detent moldings being formed on the closure cap for latchingly holding the closure on the ampoule, and a sliding part being provided which is movable relative to the closure cap in order to displace the closure stopper into the closed position.

These types of closures are known in various embodiments. Reference is made in first instance to U.S. Pat. No. 5,314,084 A, for example, and also to WO 2005/000703 and WO 2008/129144 A1 (CA 2677408 A1).

In the known closures, the closure caps of the closures are initially situated on the container in a first position in which, for example in a freeze-drying chamber, drying of the medicament accommodated in the container may be carried out via airways provided toward the interior of the container. After the freeze-drying is completed, the closure caps are then brought into a second position in which they are latched to an opening edge of the container and in which the closure stopper accommodated in the closure cap is engaged in a sealing manner into a container neck, and/or at a sealing flange is seated in a sealing manner on an end-face opening surface of the container. The movement into the closed position is usually carried out by a plate part which acts on a multiplicity of containers provided with these types of closures.

The plate part acts on a sliding part which is also, as a rule initially, moved relative to the closure cap, and then, together with the closure cap and the closure stopper accommodated in the closure cap, is moved into the latching closed position.

With regard to the action of the plate part of the freeze-drying unit, provided on the device, on the closures in order to bring them into the closed position at the end of the freeze-drying operation, it is desired that as little force as possible be applied. A large number of these types of containers may thus be simultaneously closed with a given maximum force which may be exerted by the plate part. On the other hand, a certain secure retention of the closures with respect to the containers is necessary to prevent the closures from falling off the containers during the freeze-drying or on the way into a freeze-drying chamber, or during transport and treatment inside the freeze-drying chamber.

On this basis, it is an object of the invention to advantageously provide, with respect to carrying out a freeze-drying process, a closure for a container, in particular an ampoule, in which a medicament is accommodated. It is a further object of the invention to provide an advantageous method for carrying out a freeze-drying process for containers, in particular ampoules, having a closure.

With regard to the closure, a possible approach to achieving the object is provided in that the closure stopper is displaceable relative to the cap by means of the sliding part in order to move into the closed position. As a result of the closure stopper being moved not with the cap, but instead relative to the cap, into the closed position, it is possible to fixedly mount, in particular fixedly latch, the cap on the container when the closure is first placed on the container. Further movement of the closure cap is no longer necessary during the freeze-drying and the subsequent final closure of the container. For this purpose, the closure stopper is held so that it is movable relative to the closure cap. The holding of the closure stopper may be provided in the closure cap itself. However, the holding of the closure stopper may also be initially provided only by means of the sliding part mounted in the closure cap.

The invention further relates to a method for carrying out a freeze-drying process for a medium, in particular a medicament, accommodated in a container, the container being closed by means of a closure stopper which seals in the region of a container opening, in addition the closure stopper being initially held in a cap, mounted on the container before starting the drying, in a position at a distance from the region, and being moved into a sealing position after the drying is completed.

With respect to the prior art, in this regard reference is also made to the publications cited above. In addition, the statement of the object with regard to same has been given above.

Another possible approach to achieving the object, in particular with regard to the method, thus provides that after the drying is completed, the closure stopper, which is mounted on a sliding part that is displaceably guided on the closure cap, is moved into the closed position by action on the sliding part, with the cap stationary relative to the container. After the freeze-drying process is completed, only the sliding part is further moved relative to the closure cap. After completion of the freeze-drying process, it is not necessary to move the closure cap further relative to the container. The closure stopper may be displaced into the closed position solely by moving the sliding part.

In addition, concerning the container, the invention is described with regard to an ampoule (vial). Furthermore, this is a container, for example an ampoule, preferably made of glass. However, in each case some other container may be involved, preferably a type that is used in the pharmaceutical field.

It is preferred that the closure cap has an outer cap wall. This cap wall may also be situated, in association with the ampoule, on the outside with respect to an end-face terminating surface, i.e., one which generally extends horizontally, of an opening aperture of the ampoule. The opening edge of the ampoule may have a configuration with a bead-shaped cross-section. The cap wall may thus extend on the outside with respect to the bead. Beneath the bead, the ampoule may initially further taper into an ampoule neck and then expand once again. The ampoule, which generally has a rotationally symmetrical shape and in any case is preferably cylindrical in its region below the neck, may be provided with an outer surface of the cylindrical region of the ampoule mentioned which is in flush or near flush alignment with an outer surface of the cap wall.

Further features of the invention are described or illustrated below, also in the description of the figures and in the drawings, often in their preferred association with the above-mentioned claim concepts; however, they may also be of importance in an association with only one or more individual features which are described or graphically illustrated herein, in particular the features of the claims addressed above, or independently, or in some other overall concept.

The sliding part is preferably guided on the inside of the cap wall. The guiding is also preferably provided on the closure cap. This preferably involves a single cap wall which is formed on the closure cap and which at the same time forms the outer surface.

The closure cap and/or the sliding part are preferably plastics parts manufactured in the plastics injection molding process, involving hard plastics. In contrast, the closure stopper is preferably a rubber part or consists of a thermoplastic elastomer or some other soft rubber-like material, in particular soft plastics.

The closure cap also preferably has a guide wall for the closure stopper which is separate from the cap wall. The guide wall may thus be configured in a targeted manner for the guiding task. In particular, the surface extent of the region of interaction with the closure stopper may be selected in such a way that, although in a first position of the closure stopper relative to the opening into the ampoule, i.e., for carrying out the freeze-drying process, a sufficient retaining effect initially results which prevents inadvertent displacement of the closure stopper; on the other hand an exertion of force which is not overly great is also necessary to move the closure stopper into the closed position.

In particular, it is also preferred for the guide wall to be formed as a cap neck which projects upwardly above the cap wall. The cap neck preferably has a much smaller diameter than the cap wall. The cap wall and the cap neck are also preferably closure cap parts that have a cylindrical shape. They are preferably rotationally symmetrical, but may also have ribbing or the like, also alternating over the periphery, on the outside, for example in regard to the cap wall. In addition, the outer wall and/or the cap neck may be differently configured over the periphery in regard to passage openings formed therein for conducting air and/or for a visual inspection capability. With respect to the guide wall or the cap neck, interruptions in the peripheral region may also be provided, for example for adaptation to the required size of the wall area in frictional connection with the closure stopper.

One or more vertically-oriented passage openings may be formed between the guide wall and the cap wall. These passage openings allow a part or region of the closure, in particular the sliding part, which acts on the closure stopper, to pass through. In first instance, the passage openings also allow visual inspection of the closure stopper accommodated in the closure cap.

The sliding part, which is suitably situated, at least partially, above a passage opening and is in sliding connection with the closure cap, preferably also has a pushing projection which protrudes into the passage opening. In this regard, the pushing projection may initially be provided in a first position, above the passage opening or slightly inserted into the passage opening. In the closed state after completion of the freeze-drying, the pushing projection then passes through the passage opening.

The closure stopper provided in the closure preferably has a flange with which, in the closed state, it engages on an end-face opening surface of the ampoule opening. The closure stopper also preferably has a central region, preferably having a smaller diameter than the flange, which extends upwardly from the flange. The closure stopper also preferably has an insertion portion which extends downwardly from the flange. The insertion portion has a smaller diameter, adapted to the neck opening of the ampoule, than the flange. In the closed state, the insertion portion engages into the interior of the ampoule in the opening region of the ampoule, thus sealing off the ampoule by engagement on an inner surface of the neck region.

The central region of the closure stopper preferably interacts with the mentioned guide wall of the closure cap, i.e., in particular with the closure cap neck, and is accommodated therein. The closure stopper is also preferably cylindrical. A cylindrical outer surface accordingly interacts with an inner surface of the guide wall for holding and guiding. The sliding part also preferably acts on the flange region of the closure stopper by means of the pushing projection, of which a plurality is also preferably provided, distributed over the periphery. The sliding part presses on a top side of the flange so that the closure stopper, which moves relative to the closure cap, may then be displaced with respect to the ampoule into the closed position.

It is also preferred that the sliding part engages over a top side of the closure cap, in particular also a radially outward region of the closure cap with respect to the passage openings. Thus, in the closed state, the outer wall of the sliding part may extend in flush alignment with the outer surface of the cap wall, or for a larger diameter of the outer wall may extend in an over-engaging relationship with the cap wall, or, for a slightly smaller diameter than the cap wall, may extend in an inwardly disposed manner with respect to the cap wall.

Furthermore, it is preferred that the closure cap or the sliding part is coverable by a lid part after the closure stopper is moved into the closed position.

The lid part may be provided so that, for example, it may be snapped onto the closure cap. However, it may also, for example, be welded to the closure cap.

It is also preferred that the lid part is non-detachably formed in one piece with the closure cap or the sliding part. A one-piece design with the sliding part as an injection-molded part is preferred. In this regard, an articulating region of reduced thickness may be formed in the transition between the sliding part and the lid part.

Furthermore, one or more closure pins which project upwardly in a free-standing manner may be provided on the closure cap, In the closed state, these closure pins may engage with corresponding openings in the lid part. In particular, in the engaged state with respect to the openings mentioned, they may also be welded to same.

The invention is explained in greater detail below with reference to the accompanying drawings, which, however, illustrate only exemplary embodiments:

Figure 1:
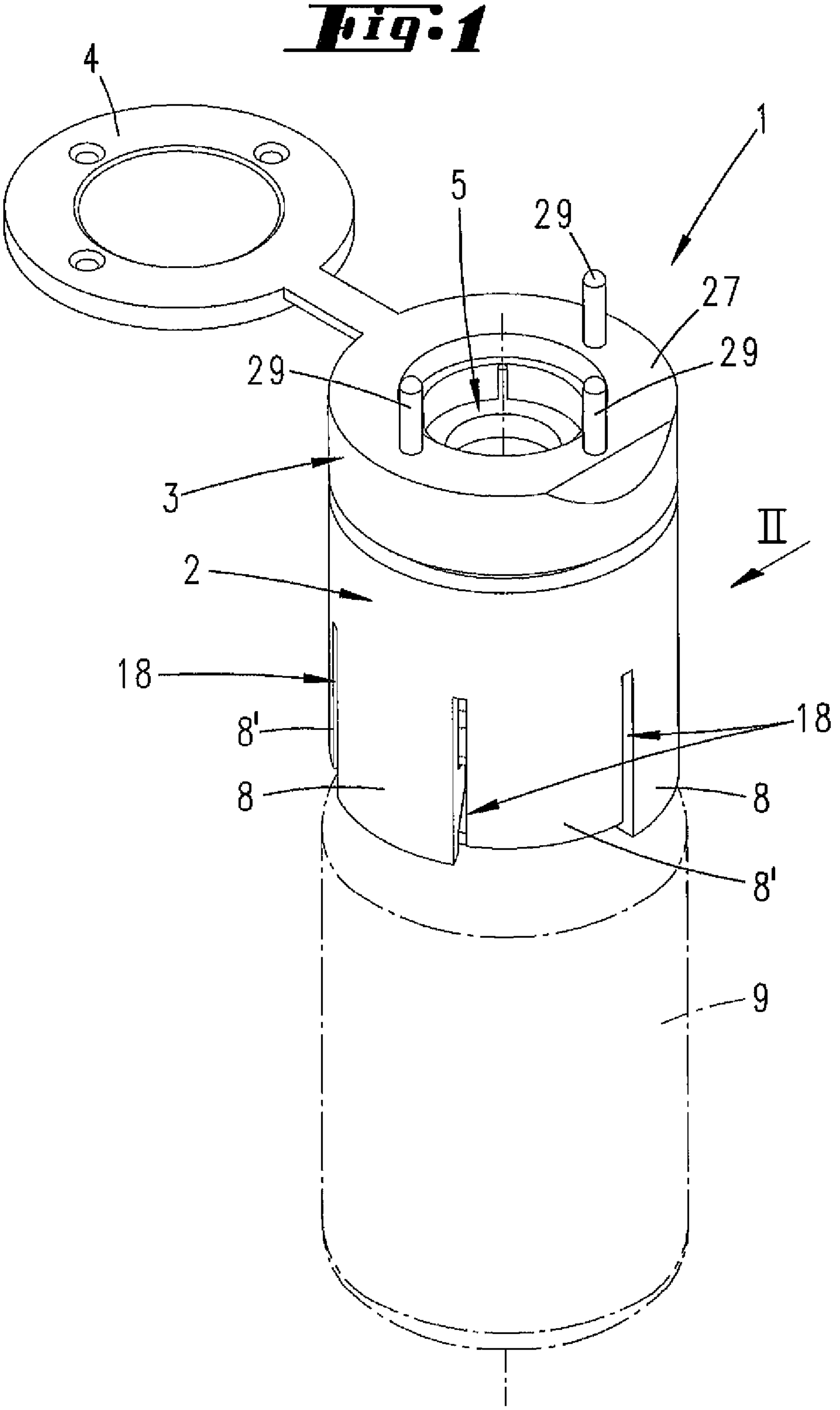
FIG. 1 shows a first embodiment of a closure placed on an ampoule, with the lid open.

A first embodiment of the closure is illustrated and described, initially with reference to FIGS. 1 to 9.

This is a closure 1 which is seated on a container, the container in the present case being formed as a medical ampoule 9. In the ampoule 9, there is, preferably initially, i.e., prior to freeze-drying which is optionally to be carried out, a medicament in liquid form. The medicament may be converted to powdered form, for example by freeze-drying which is to be carried out.

In particular, the closure 1 consists of a closure cap 2 and a sliding part 3, which in the exemplary embodiment is formed so that in places it projects upwardly with respect to the closure cap 2. A lid 4 is connected to the sliding part 3.

Figure 8:
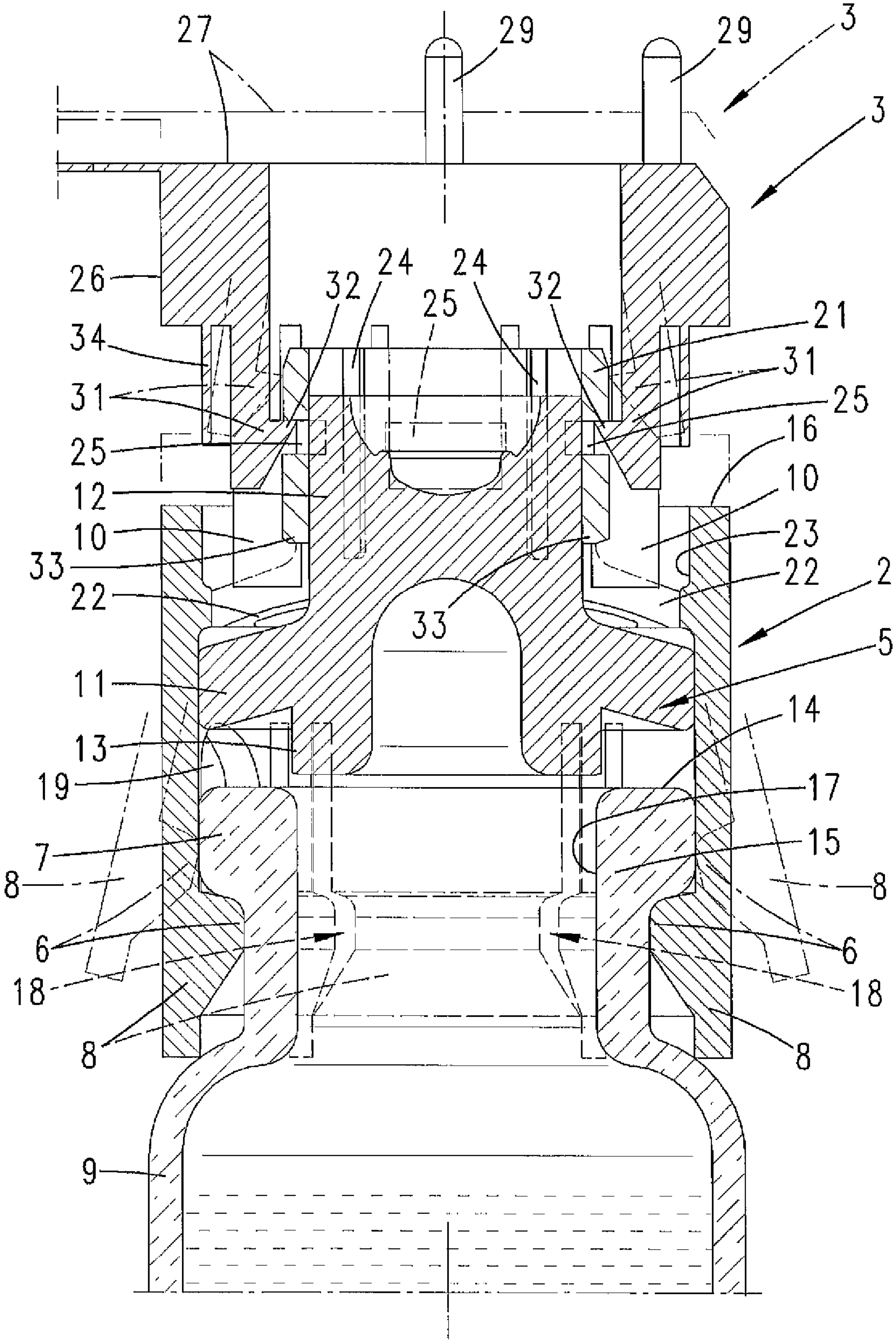
FIG. 8 shows the closure according to FIG. 1 in cross-section, in a freeze-drying position.
Figure 9:
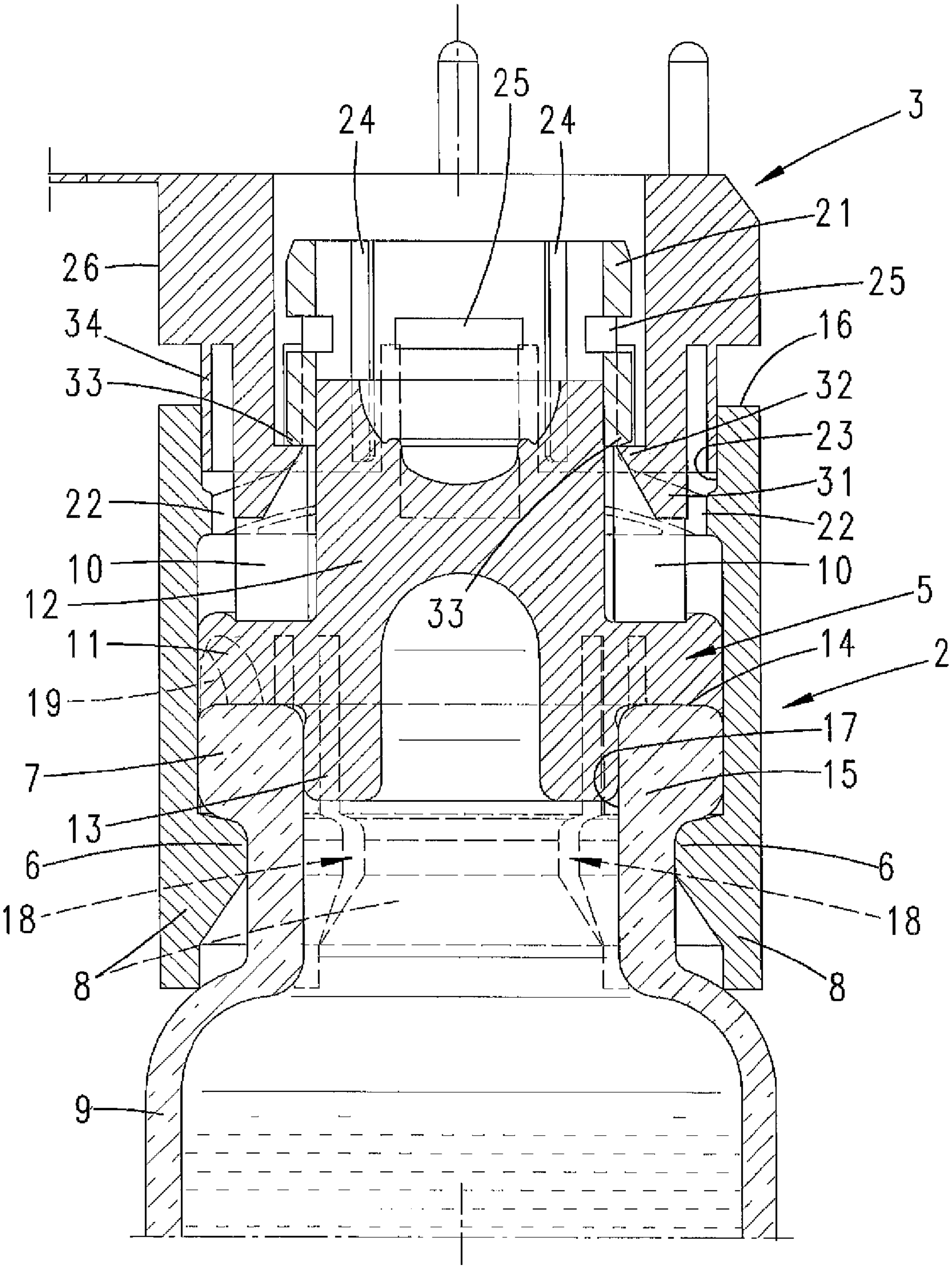
FIG. 9 shows an illustration corresponding to FIG. 8, but with the closure stopper pushed into its sealing position.
Figure 10:
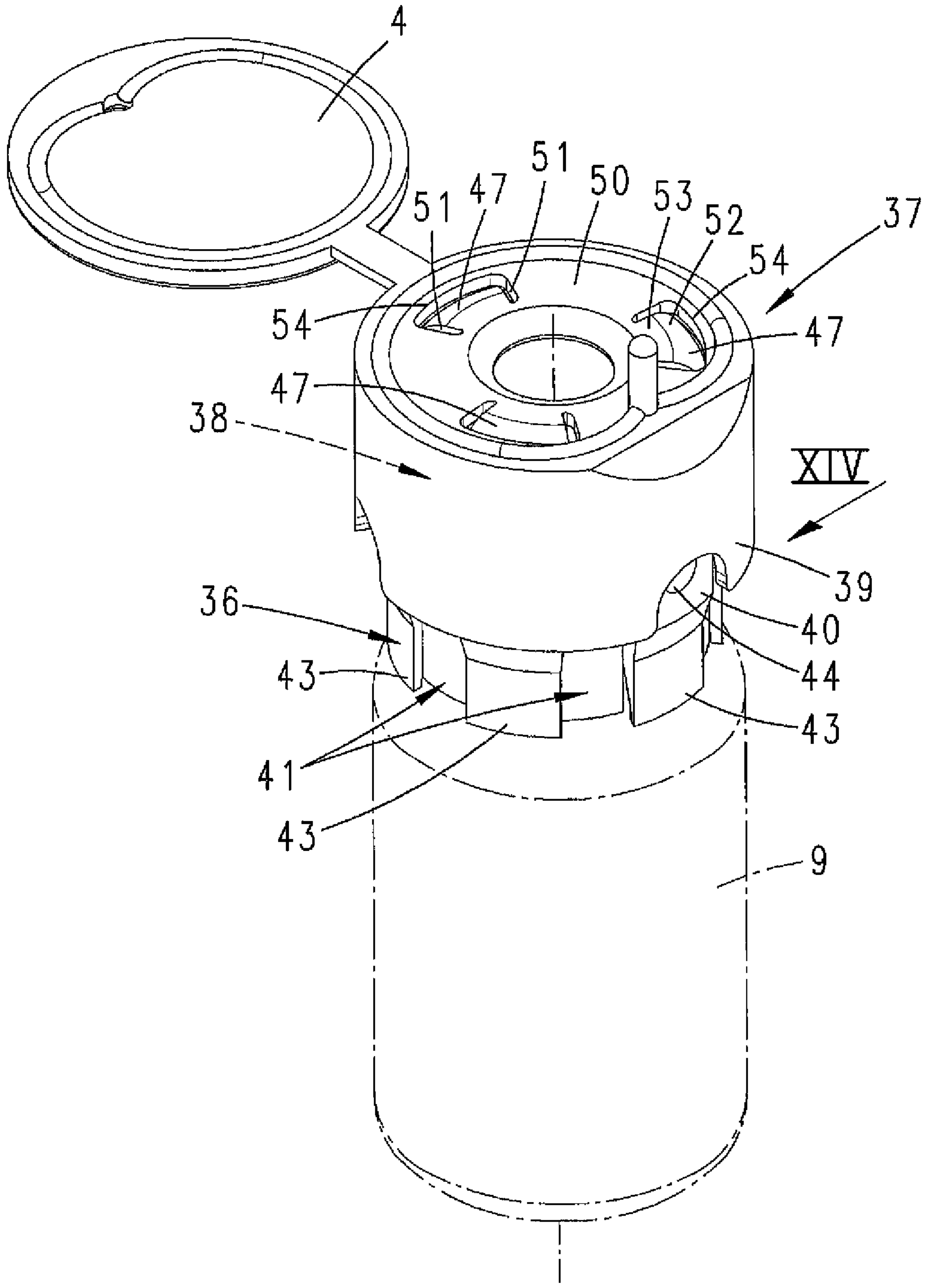
FIG. 10 shows a perspective view of another closure.
Figure 11:
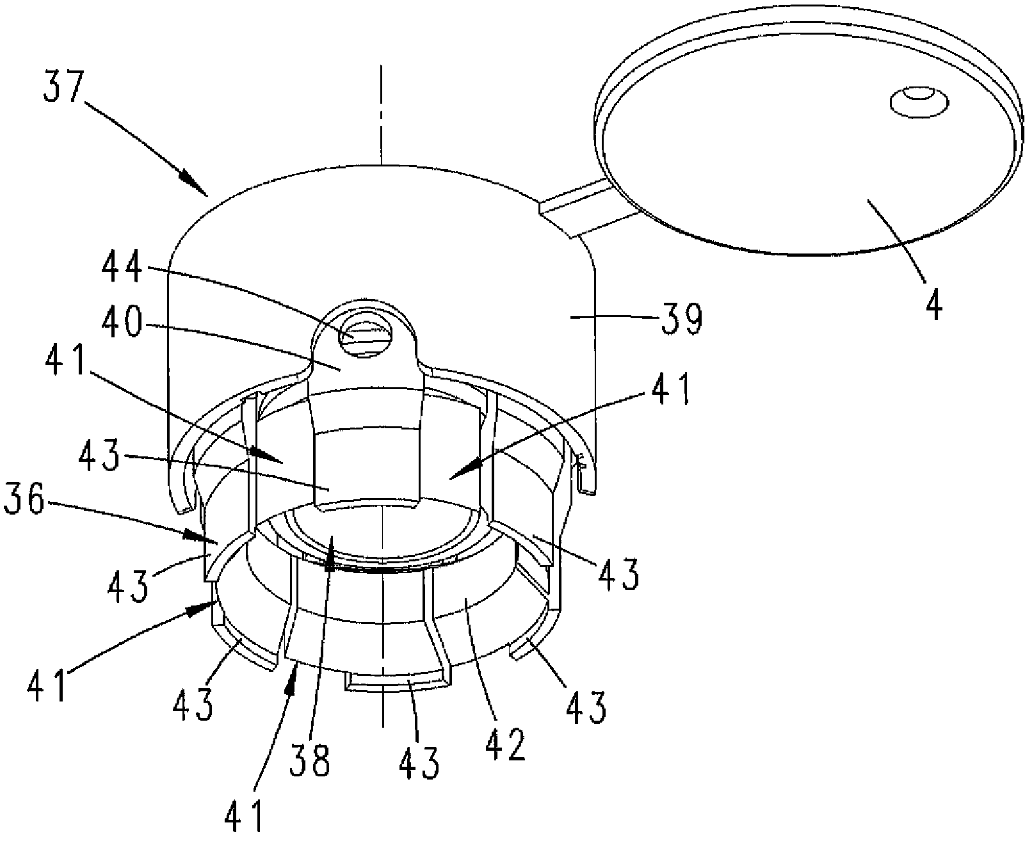
FIG. 11 shows the closure according to FIG. 10 in an oblique perspective view from below.
Figure 12:
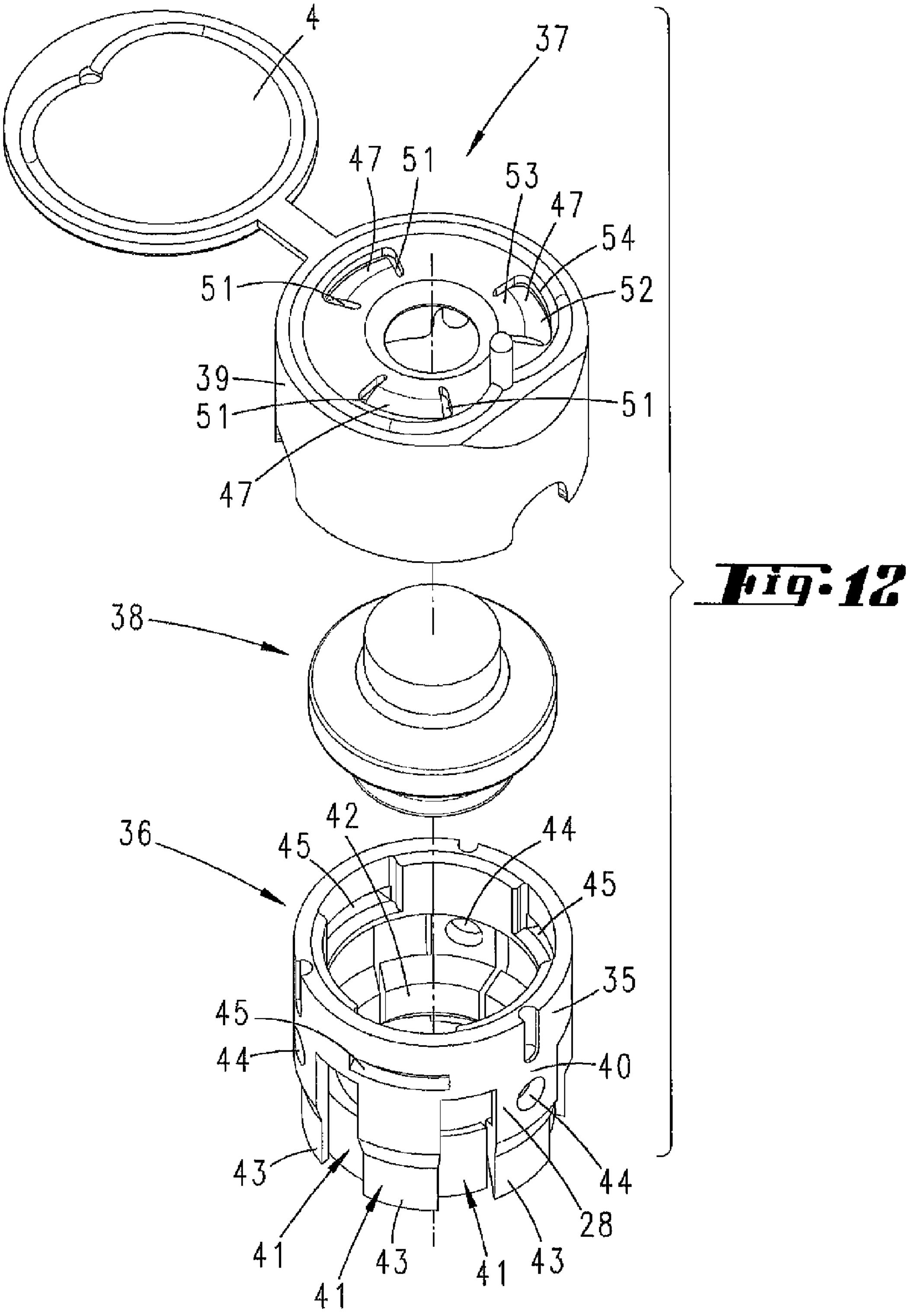
FIG. 12 shows the closure according to FIG. 10 and FIG. 11 in an exploded illustration, together with an associated closure stopper.
Figure 13:
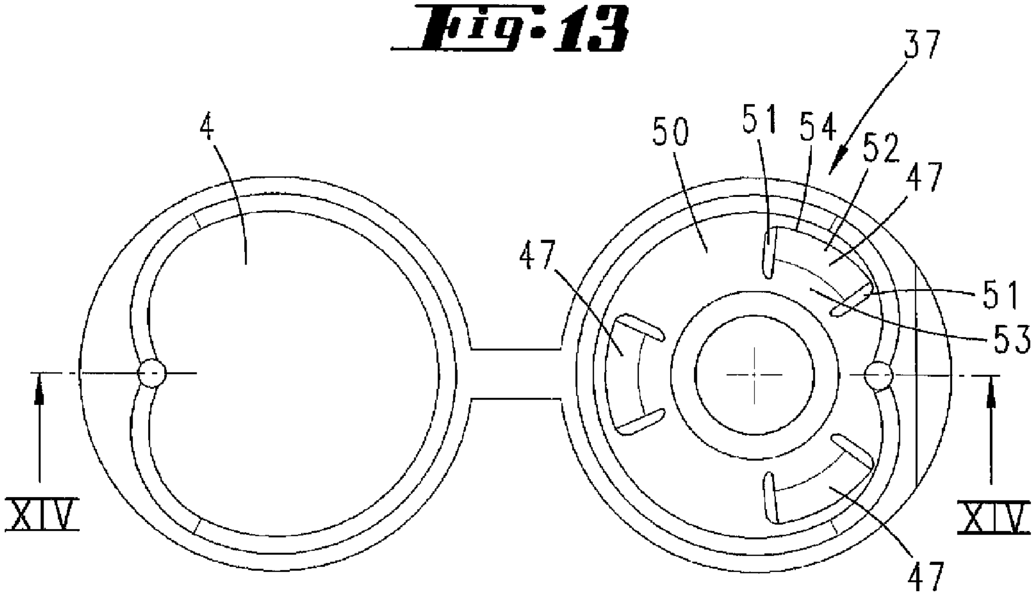
FIG. 13 shows the sliding part of the closure according to FIG. 10 in a view from above.
Figure 14:
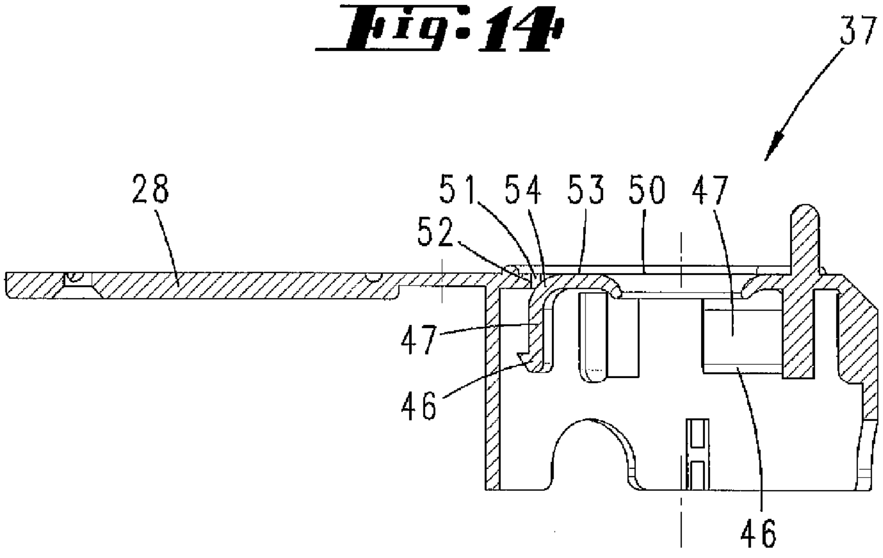
FIG. 14 shows a cross-section of the subject matter according to FIG. 13, the section being along the line XIV-XIV.
Figure 15:
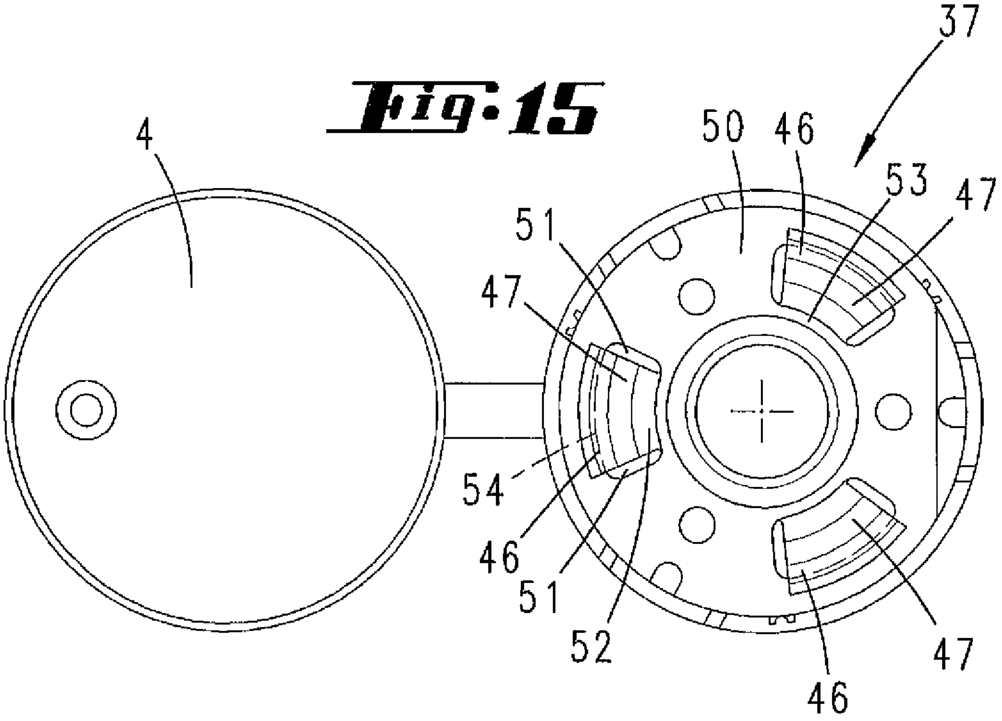
FIG. 15 shows the sliding part according to FIG. 13 in a view from below.
Figure 16:
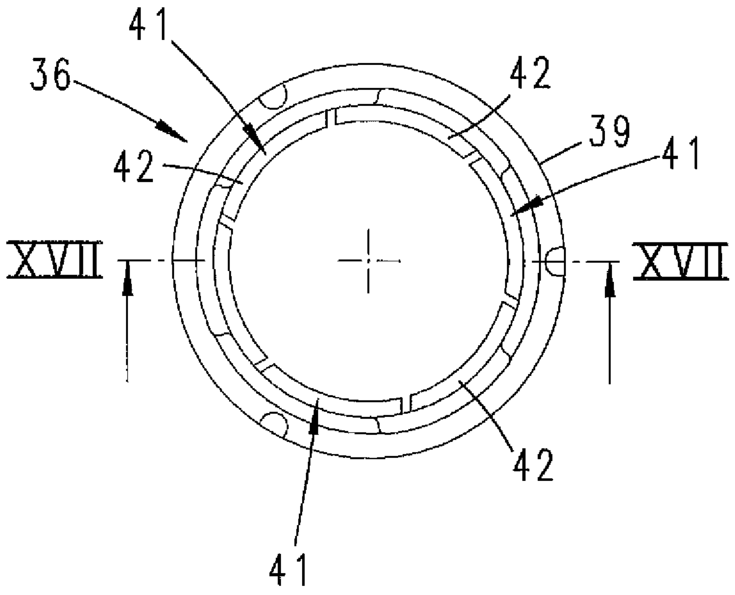
FIG. 16 shows the closure cap in a view from above.
Figure 17:
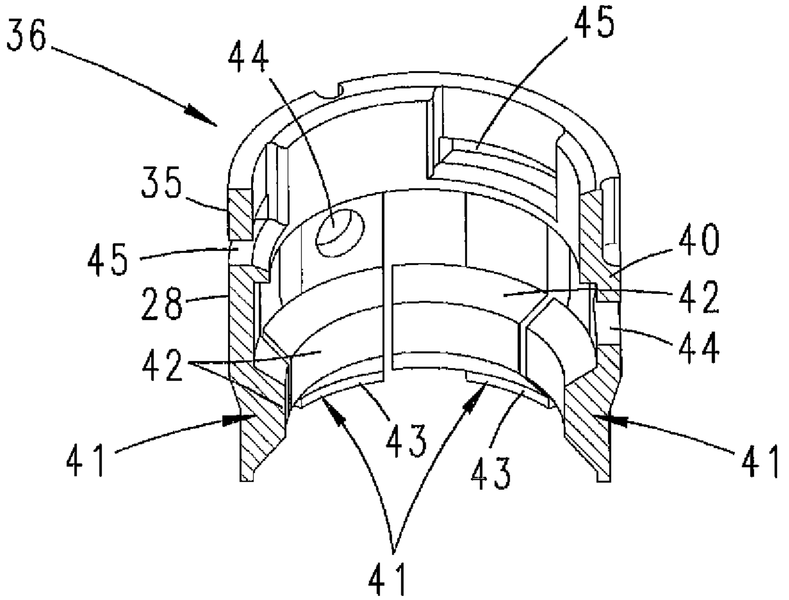
FIG. 17 shows a cross-section of the subject matter according to FIG. 16, the section being along the line XVII-XVII.

As is further apparent from the cross-sectional illustrations in FIGS. 8 and 9, for example, in addition a closure stopper 5 is accommodated inside the closure cap 2.

The closure cap 2 also has detent moldings 6 which engage beneath an opening bead 7 of the ampoule 9 in the latched state. As is apparent in particular from FIG. 8, the detent moldings are formed on detent arms 8 which are outwardly bendable in an elastic manner, and which are accordingly able to yield outwardly in a resilient manner when the closure cap 2 is placed onto the ampoule 9 (see the position illustrated by dashed lines).

As is further apparent from a comparison of FIGS. 8 and 9, by means of the sliding part 3, the closure stopper 5 is moved relative to the closure cap 2 from an open position according to FIG. 8, in which freeze-drying may be carried out, into a closed position according to FIG. 9. In the closed position according to FIG. 9, the sliding part 3 is moved downwardly relative to the closure cap 2, the closure stopper 5 having been acted on by pushing projections 10 formed on the sliding part for displacement into the closed position. The sliding part 3 acts directly on the closure stopper.

The closure stopper has a flange 11 and a central region 12. In addition, a sealing projection 13 is formed beneath the flange 11.

In the closed position according to FIG. 9, a bottom side of the flange 11 rests on an end face 14 of the bead 7 of the ampoule 9. The sealing projection 13 is inserted into the ampoule neck 15, and is in sealing contact with the inner cylindrical surface 17 of the ampoule 9.

Figure 2:
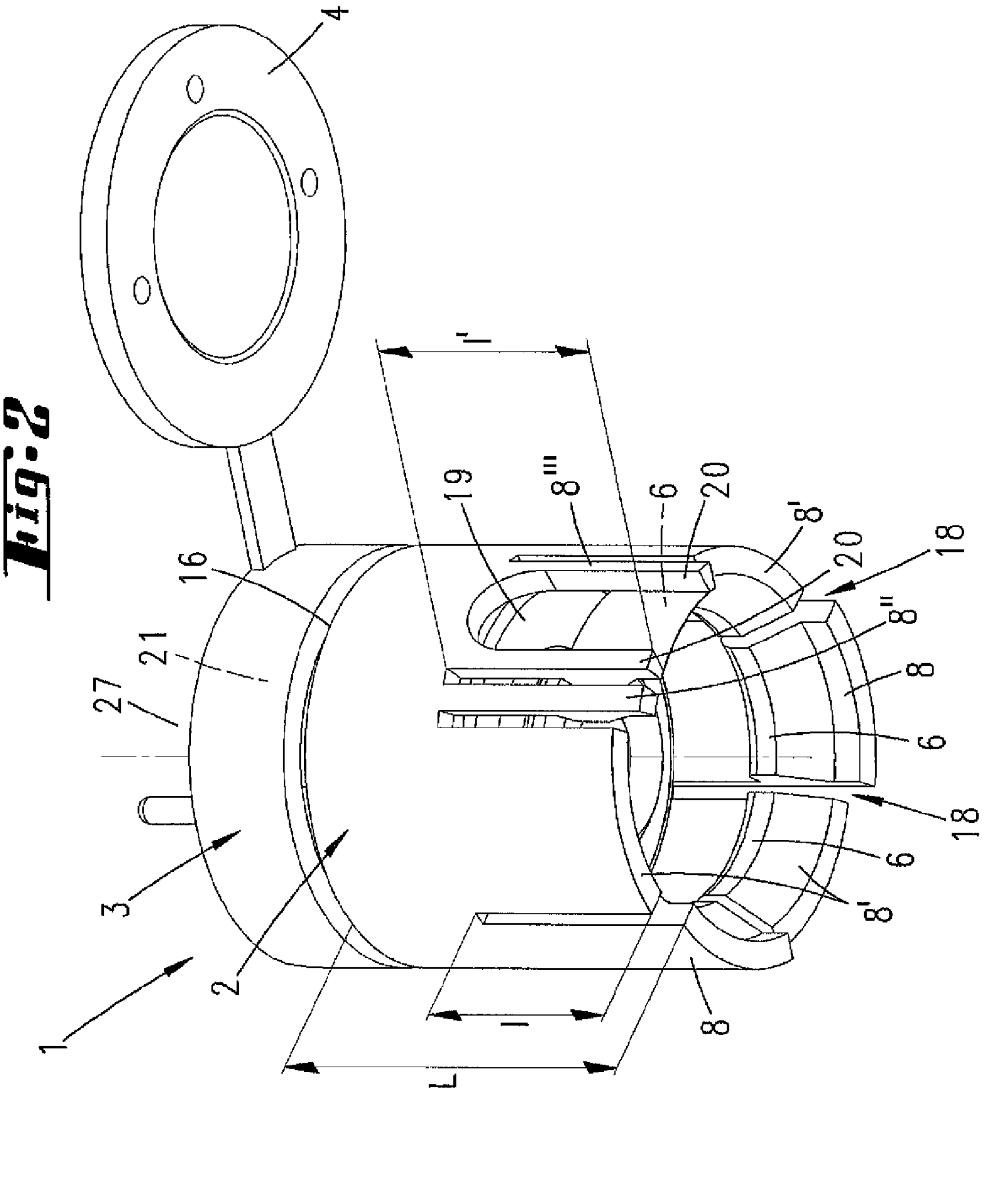
FIG. 2 shows the closure according to FIG. 1 in a perspective oblique view from below.

From the perspective illustration in FIG. 2, it is apparent that downwardly extending detent arms 8 having different widths are formed on the closure cap 2. A total of seven detent arms 8 are distributed over the periphery, of which three detent arms 8' do not project downwardly as far as the remaining detent arms. A detent arm 8 has a free length l or l' which is one-third to two-thirds the axial length L of the closure cap 2. The axial length L is measured starting at the lower end of a detent arm 8, having the farthest downward projection, to the shoulder 16, i.e., only to the height of the cap neck 21, described in greater detail below, which height also extends further.

A peripheral extent of a detent arm 8 preferably corresponds to a circumferential angle $\alpha$ of 2° to 60°; of the seven detent arms mentioned, preferably six detent arms extend over a circumferential angle of 30° to 60°, and one arm 8" extends over a circumferential angle between 2° and 10°.

A peripheral interspace 18 between two detent arms preferably corresponds to a circumferential angle of 1° to 5°, One detent arm 8" is provided with an aperture 19 in its upper region, i.e., toward the sliding part 3. The aperture 19 allows visual inspection of the closure stopper accommodated therein. In the lower region, the engagement bead 6 is nonetheless formed to be continuous in the peripheral direction. However, on the edge of the continuously formed detent bead 6, column-like extensions 20 of the cap wall which are associated with the outer wall are integrally formed all the way to the bottom. This results in an arch-like configuration of this detent arm 8" on the outside which is completely open in the upper region, but in the lower region is closed by the back wall of the detent molding 6 with continuous frame portions.

At the same time, this configuration of the detent arm 8" allows an advantageous grip when using a tool to bring the closure into the latched position according to FIG. 8 prior to starting freeze-drying.

Figure 3:
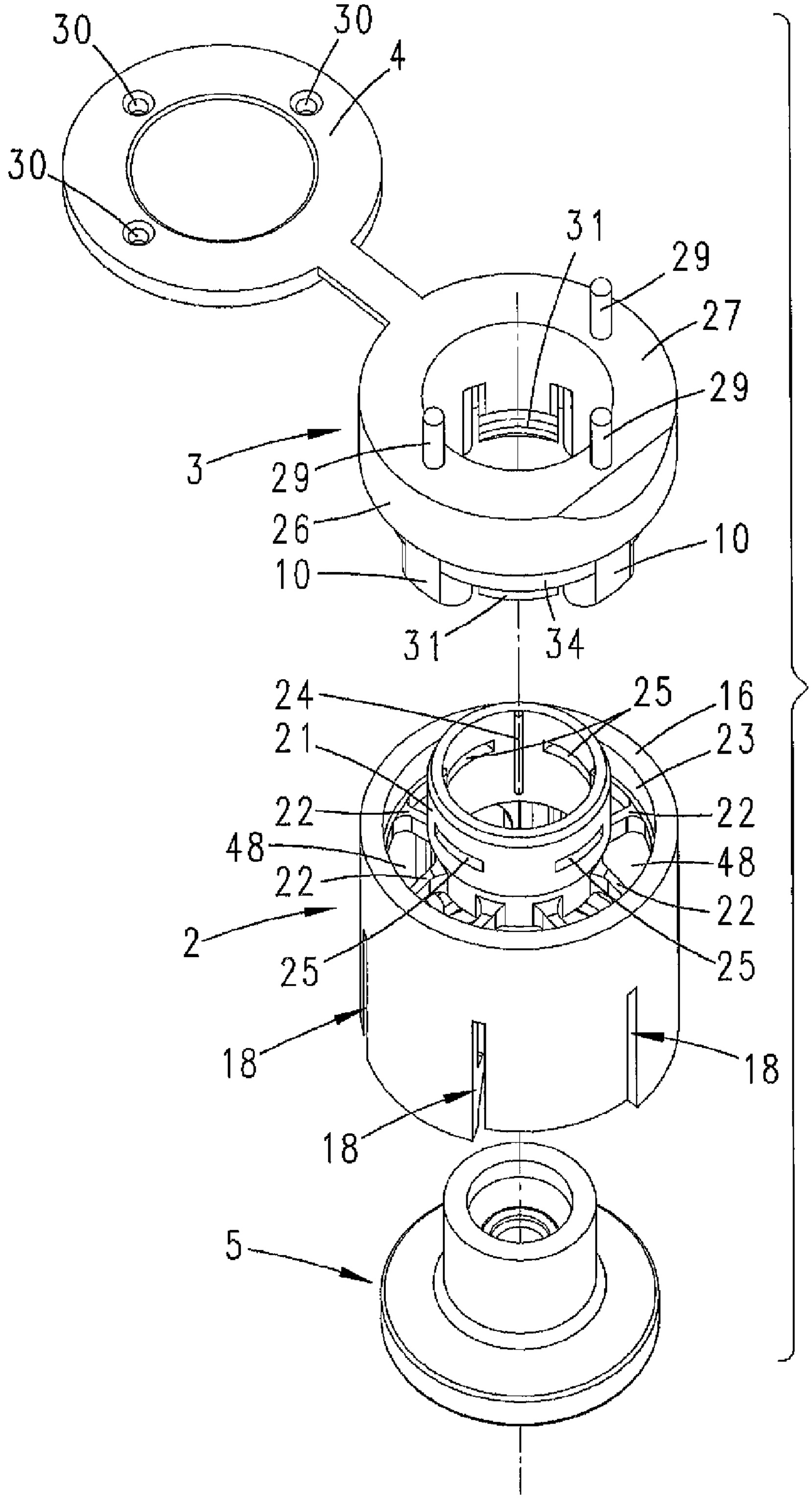
FIG. 3 shows the closure according to FIG. 1 and FIG. 2 in an exploded illustration, together with an associated closure stopper.
Figure 4:
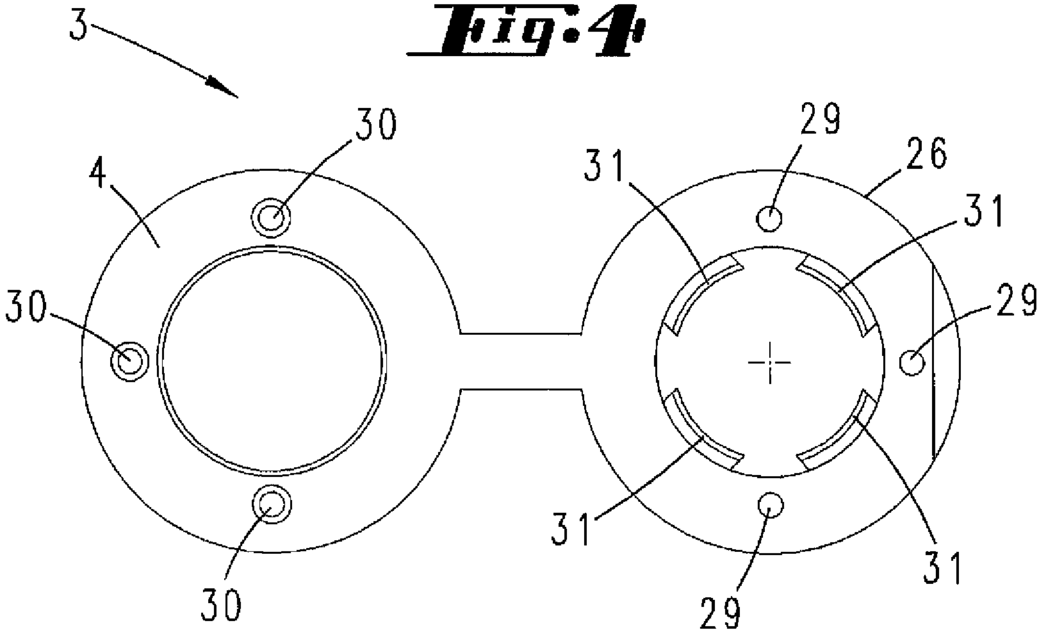
FIG. 4 shows the sliding part of the closure according to FIG. 1, in a view from above.
Figure 5:
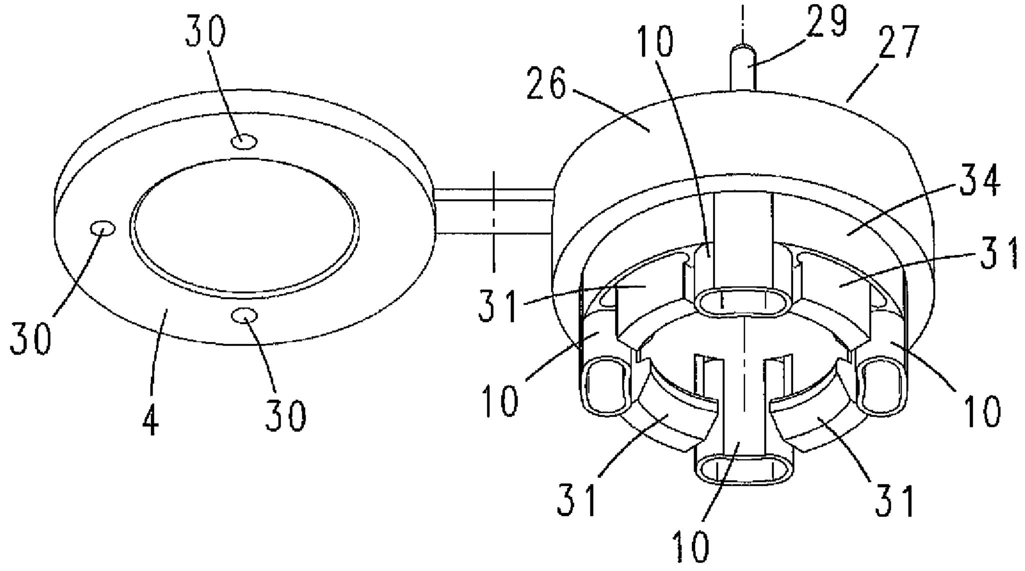
FIG. 5 shows the sliding part according to FIG. 4 in a perspective oblique view from below.
Figure 6:
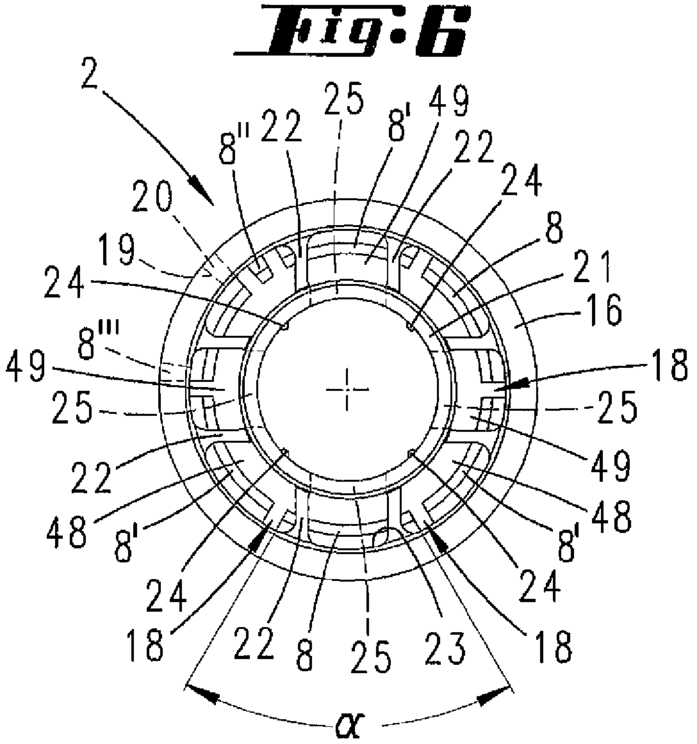
FIG. 6 shows the closure cap in a view from above.
Figure 7:
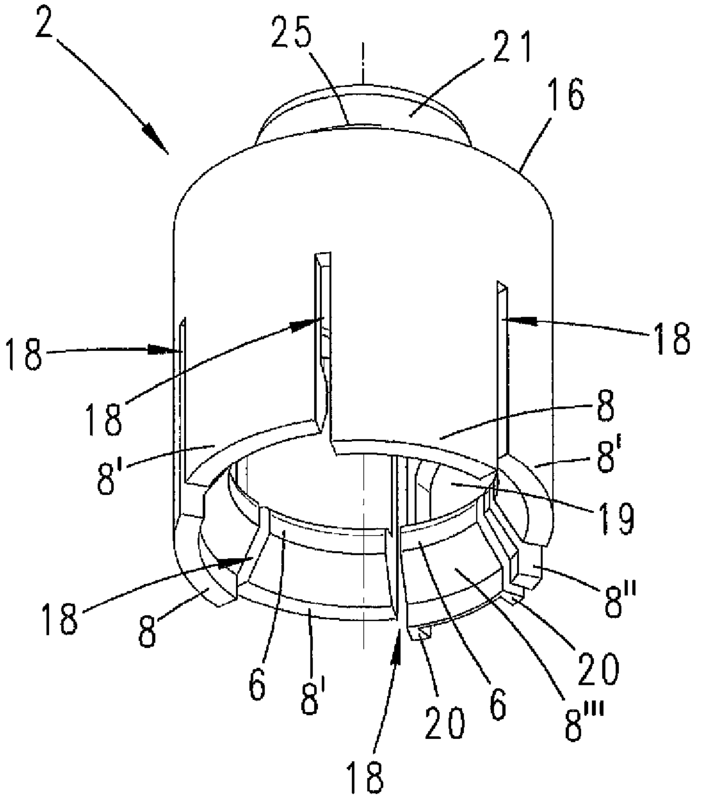
FIG. 7 shows the closure cap in an oblique view from below.

It is further apparent from the illustration according to FIG. 3, and also from the cross-sectional illustration according to FIGS. 8 and 9, that a cap neck 21 is formed radially inwardly with respect to an outer wall of the closure cap 2. The cap neck 21 is formed in one piece with the outer cap wall 23 via radial webs 22. Part of the cap neck 21 projects upwardly above the shoulder 16, but part is also formed within the cap wall 23, beneath the shoulder 16. Overall, the cap neck is a cylindrical body.

On the inner side, the cap neck 21 has one or more axial webs 24 which serve for the restraining interaction with an outer surface of the central portion 12 of the closure stopper 5. The axial webs 24 protrude on the inner side in a bead-like manner with respect to an inner surface of the cap neck 21. The closure stopper 5 may thus be reliably held in the position according to FIG. 8. In addition, the cap neck 21 has horizontal detent grooves 25, which in the exemplary embodiment are configured as through openings. As is apparent from FIG. 8, for example, these detent grooves may serve to hold the sliding part 3 in an upper position (initially).

Additionally or alternatively, the axial webs mentioned may be formed on the outer surface of the central region 12 of the closure stopper 5.

The sliding part 3 (see FIGS. 4 and 5 in particular) has, in first instance, at the top, an outer, vertically extending peripheral wall 26. The peripheral wall 26 merges into an upper end wall 27 which extends horizontally in the use state, and which in the exemplary embodiment preferably has an annular ring shape. This end wall 27 is also preferably overlaid by a lid 4 in the closed state. Furthermore, closure pins 29 are provided in the end wall 27 which, in the closed state, pass through openings 30 in the lid part. The closure pins initially project upwardly, and may provide a weld-like seal by hot-forming, for example. As a result, however, they may also have an enlarged head at the top and hold the lid 4 in the closed position in a positive-fit manner.

On its underside, the sliding part 3 has snap-in fingers 31 which, in cross-section, form an inwardly protruding detent portion 32 (see FIGS. 8 and 9, for example). With this detent portion 32, the detent moldings may engage in the detent openings 25 in a first position of the sliding part 3 relative to the closure cap 2. Due to the detent moldings 32 having a barb-like shape, after the sliding part 3 is pushed further down into the position according to FIG. 9, they can engage in a blocking manner beneath an undercut portion 33 which is also formed on the above-described cap neck. Moving back the sliding part 3 relative to the cap part 2 is thus no longer possible after this latched position is achieved.

A wall 34 is provided radially outwardly with respect to the snap-in fingers 31, but encloses the snap-in fingers 31 only on a portion of their free length. A lower part of the snap-in fingers 31 is free in the radially outward direction.

In the exemplary embodiment, a total of four snap-in fingers 31 are distributed over the circumference. The snap-in fingers 31 preferably extend over a circumferential angular range between 10°and 60°.

Pushing projections 10 are provided in the peripheral interspace between the snap-in fingers 31, but also protruding outwardly with respect to an outer wall of the snap-in fingers 31. In the exemplary embodiment, these pushing projections are formed as hollow shapes having an oval cross-section. The pushing projections 10 extend vertically. The hollow shape of the pushing projections 10 formed by a circumferential wall results in an advantageous introduction of force into the closure stopper 5 via the end face of the wall which overlays the sliding forces.

These pushing projections 10 act on the closure stopper 5, on the top of the flange 11, for displacement into the closed position.

The pushing projections 10 are provided in association with an annular space formed between the cap neck 21 and the cap wall 23. The annular space is subdivided by the radial webs 22 which extend radially with respect to same. The radial webs 22 leave openings 48 for the pushing projections 10 to pass through, as well as openings 49 for the snap-in fingers 31 to pass through. It is evident that the openings 48 are adapted to the outer contour of the pushing projections. The dimensions of the openings are provided in such a way that a slideway for the pushing projections 10 results.

A second embodiment is described with reference to FIGS. 10 to 19. The above statements also apply to this second embodiment unless particulars or formations are separately described, for example with regard to a different function or configuration. Different reference numerals for identical or functionally equivalent parts have been selected only in the interest of improved readability.

The second embodiment is basically also composed of a cap part 36 and a sliding part 37. In this embodiment also, a closure stopper 38 is accommodated inside the cap part 36.

Figure 18:
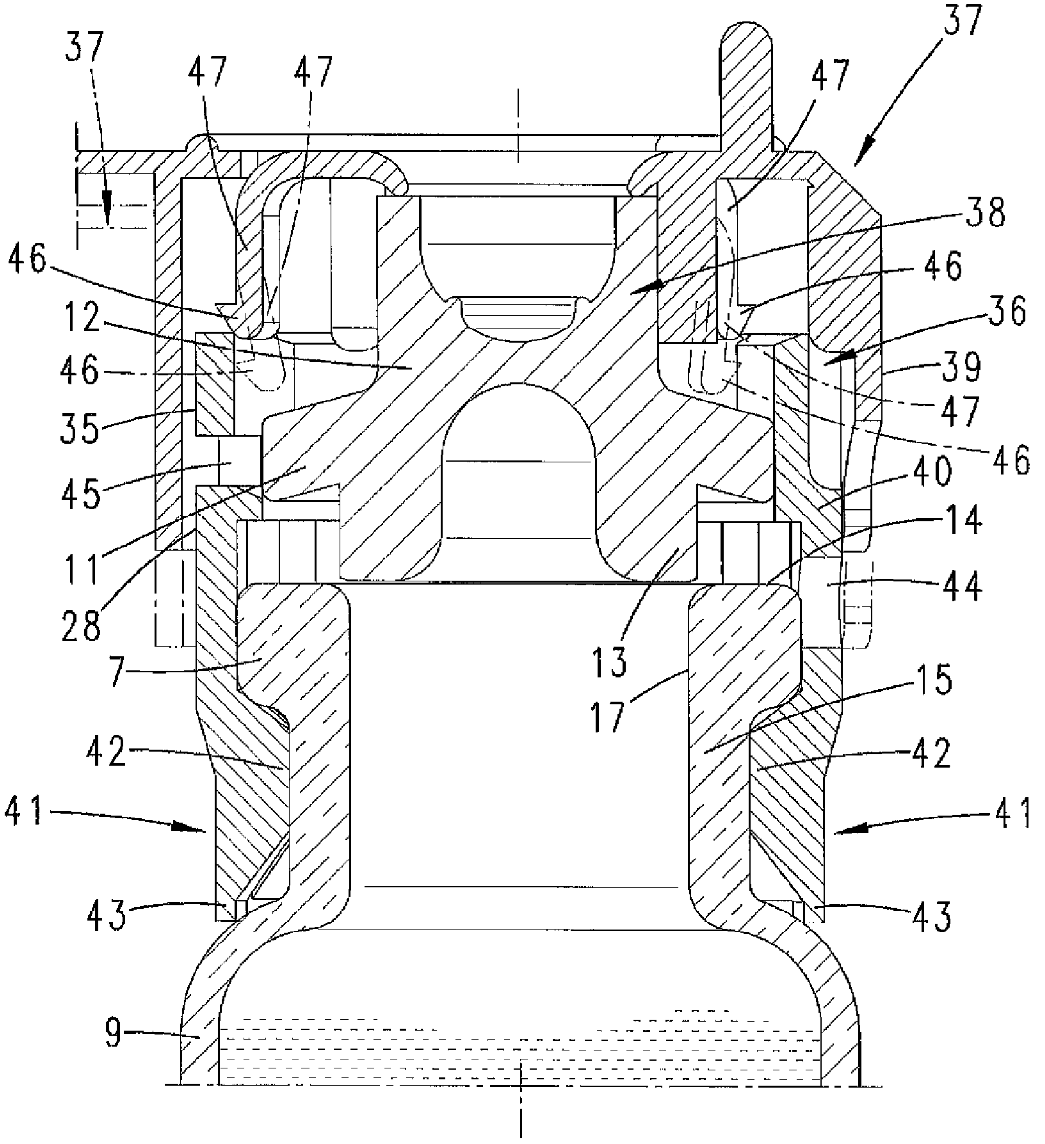
FIG. 18 shows a cross-section of the closure according to FIG. 10 in a freeze-drying position.
Figure 19:
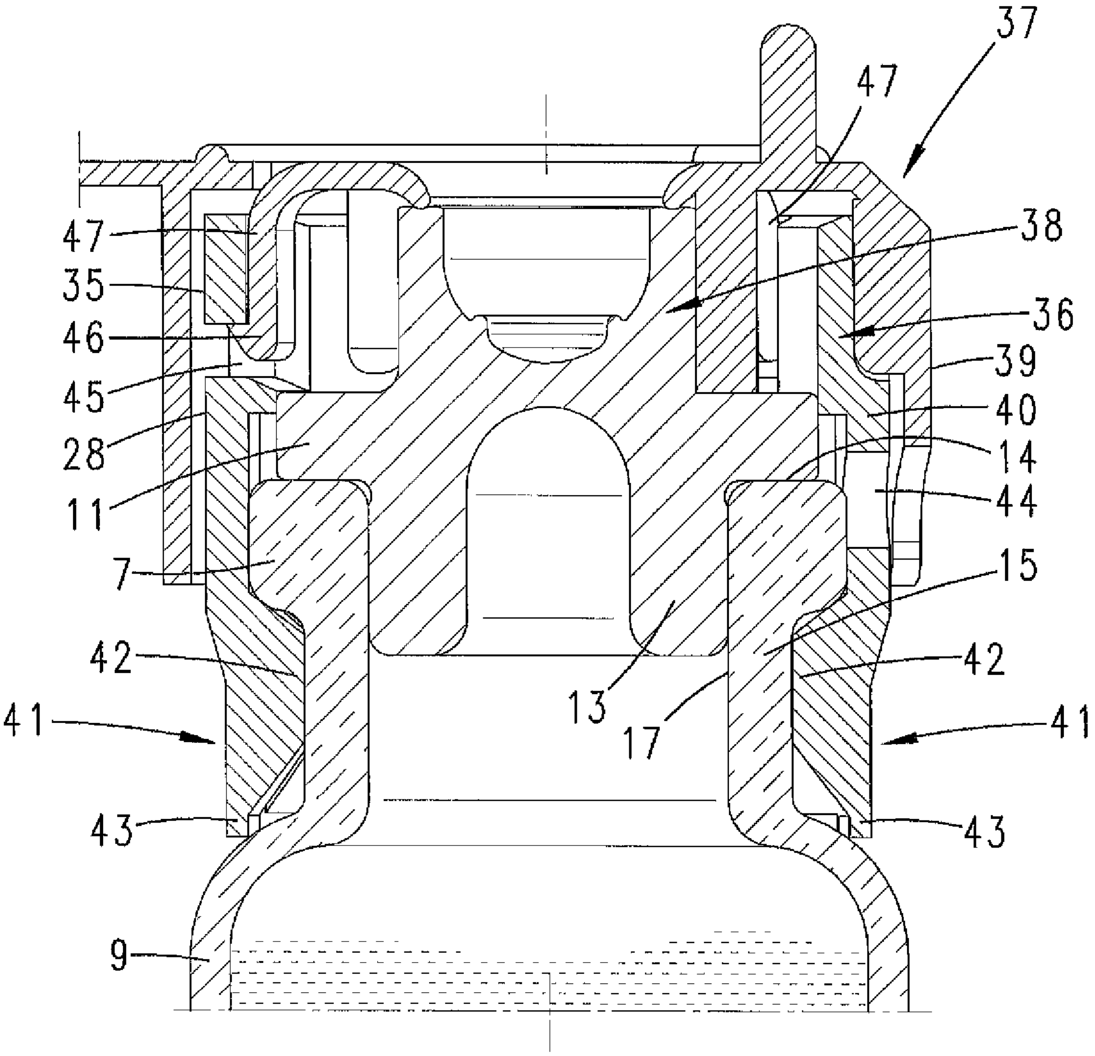
FIG. 19 shows an illustration corresponding to FIG. 18, with the closure stopper in the sealing position.

In contrast to the embodiment described above, it is provided in first instance that the sliding part 37 has an outer skirt wall 39 which in places, over a portion of its height, engages over an outer wall 40 of the cap part 36, in particular in the freeze-drying position according to FIG. 18, and to a greater extent in the closed position according to FIG. 19. Also in this embodiment (see in particular FIG. 11), the cap part 36 has a plurality of detent fingers 41 distributed over the periphery. These detent fingers 41 have inwardly protruding detent beads 42. On the outside, the detent fingers have an extension portion 43 which projects downwardly. This extension portion 43 is formed in the shape of a thin, circular segment-shaped wall, and also extends only over a smaller peripheral extent than a detent finger 41. The extension portion may be used to limit the snap-on movement as the result of contact with the shoulder of the ampoule (see FIG. 19, for example).

The same as for the detent fingers of the first embodiment, in this second embodiment, the detent fingers 41 preferably extend over a circumferential angular range of 30° to 60°.

Some of the detent fingers 41, preferably every other detent finger 41, a total of six detent fingers 41 being preferably formed, have through openings 44 at the top, above the detent beads 42 but beneath the transition 28 into an annular ring-shaped peripheral wall 35 of the cap part 36. These through openings 44 may be used for visual inspection, for example of the closure stopper held therein.

In addition, grooves—in the exemplary embodiment, through openings 45—which extend in the peripheral direction, are provided above the connection 28 of the detent fingers 41 to the peripheral wall 35 mentioned. These through openings extend with a circular segment shape, preferably over a circumferential angle between 10° and 40°.

In the closed state (see FIG. 19), barb-like detent projections 46 from detent arms 47 formed on the sliding part may engage with these circumferential grooves, in a similar manner as in the first exemplary embodiment. FIG. 18 shows the intermediate position of the detent arms 47 over the course of the peripheral wall 35, in a dashed-line illustration.

The use with regard to both embodiments is carried out as follows:

In first instance, the cap and the sliding part as well as the closure stopper are manufactured separately. The closure stopper is then pressed into the cap, or in any case, preferably in the embodiment in FIGS. 10 to 19, is initially pressed into the sliding part 37, into a position according to FIG. 8 or FIG. 18. The configuration in FIG. 18 is preferably achieved by initially introducing the closure stopper 5 into the sliding part 37 and then pressing the sliding part, together with the closure stopper 5 located therein, into the cap part 36. In the other case, in which the closure stopper 5 is initially inserted into the closure cap or the cap part, the sliding part is placed on this assembly from above. In any case, the sliding part 37 is initially brought into a first latched position according to FIG. 8 or FIG. 18. In both cases, it is thus possible to deliver the complete closure as one part to a filling line in which a medicament is filled into the containers, and a subsequent freeze-drying process is optionally carried out. Assembly may already take place in the manufacturing plant for the closure, and is not required in the course of mounting the closure on the container, which customarily does not take place until in the manufacturing plant for the pharmaceutical agent. This is also particularly important from the standpoint that in the manufacturing plant for the pharmaceutical agent, the connection of the closure to the container must be carried out in an ultra-clean room. Essential process steps with respect to this ultra-clean room may thus be reduced.

In a further step, the closures which have been prefabricated in this way are then connected to ampoules that are filled with a medicament. This may take place, for example, in a star wheel device of a rotary system. The connection is established by mounting the caps on the ampoule according to FIG. 8 or FIG. 18 in the latched position, which at the same time is the final position. For this purpose, a suitable device may in each case act directly on the cap, so that no displacement of the closure stopper or of the sliding part relative to the cap results in this processing step. The device does not act on the sliding part in this process step.

In this position of the mounted closures, the ampoules are then brought into a freeze-drying unit. By this, there is achieved drying, at freezing temperatures, of medicament present in the ampoules. Since the closure stoppers are not seated on the opening edge of the ampoule or do not even engage into this, and in addition, airways through the cap into the interior of the ampoule are retained, effective drying may be achieved.

At the end of the freeze-drying operation, the ampoules are closed by pushing the sliding part into the position according to FIG. 9 or FIG. 19, in each case from above. As is apparent, in each case, the cap remains in the position relative to the ampoule which it has already previously assumed. At the same time, the closure stopper is brought into its sealing position by the downward displacement of the sliding parts. The pressed-down position of the sliding parts, in which the closure stoppers are in the closed position, is also secured by latching. Detent arms of the sliding part engage with corresponding detent openings or downward detent projections of the cap, in particular preferably on the inner side.

Lastly, the lid 4 may also be folded over onto the sliding part, thus achieving an additional closure by means of the closure pins. This closure may in particular be used as a tamper-evident closure.

With regard to the embodiment in FIGS. 10 to 18, it is also important that in a cross-section (see FIG. 18, for example), the sliding part 37 engages over an upper end face of the outer wall 40 of the closure cap in a U shape, in particular preferably on the outer side by means of the skirt wall 39, and on the inner side preferably by means of a detent arm 47. The detent arms 47 are connected via a cover 50 of the sliding part 37 to the skirt wall 39, which in the present case forms the outer wall. For advantageous elastic connections of the detent arms 47, in the region of the cover wall 50, the detent arms are formed by radially-oriented cut-outs 51 with a cover portion 52 which extends, for example, in the plane of the cover 50. The connection of the detent fingers 47 is provided radially inwardly in a connection region 53, while the radially outward detent fingers, in the present case engaging beneath the cover edge 54 in this regard, are not connected to the cover 50.

All features disclosed are (in themselves) pertinent to the invention. The disclosure content of the associated/accompanying priority documents (copy of the prior application) is also hereby included in full in the disclosure of the application, including for the purpose of incorporating features of these documents in claims of the present application. The subsidiary claims in their optional subordinated formulation characterize independent inventive refinement of the prior art, in particular to undertake divisional applications based on these claims.

LIST OF REFERENCE NUMERALS

1 Closure
2 Closure cap
3 Sliding part
4 Lid
5 Closure stopper
6 Engagement bead
7 Bead
8 Detent arm 8' Detent arm 8" Detent arm
9 Container
10 Pushing projection
11 Flange
12 Central region
13 Sealing projection
14 End face
15 Ampoule neck
16 Shoulder
17 Surface
18 Peripheral interspace
19 Aperture
20 Extension
21 Cap neck
22 Radial web
23 Cap wall
24 Axial webs
25 Detent grooves
26 Peripheral wall
27 End wall
28 Transition
29 Closure pin
30 Openings
31 Snap-in finger
32 Detent portion
33 Undercut portion
34 Wall
35 Peripheral wall
36 Cap part
37 Sliding part
38 Closure stopper
39 Skirt wall
40 Outer wall
41 Detent finger
42 Detent bead
43 Extension portion
44 Through opening
45 Through opening
46 Detent projection
47 Detent arm
48 Opening
49 Opening
50 Cover, cover wall
51 Cut-out
52 Cover portion
53 Connecting region
54 Cover edge
l Free length l' Free length
L Length

The invention claimed is:

1. A closure (1) for an ampoule (9), in which a medicament is accommodated, comprising a closure cap (2) and a closure stopper (5) accommodated in the closure (2), detent moldings (6) being formed on the closure cap (2) for latchingly holding the closure (1) on the ampoule (9), and a sliding part (3) being provided which is movable relative to the closure cap (2) in order to displace the Closure stopper (5) into a closed position, wherein the closure stopper (5) is displaceable relative to the closure cap (2) by means of the sliding part (3) in order to move the closure stopper into the closed position;

wherein the closure stopper has a flange (11), as well as an insertion portion which extends downwardly from the flange;

wherein the sliding part acts on the flange (11) by means of a pushing projection (10);

wherein the pushing projection (10) is formed on the sliding part, and wherein the flange (11) rests in the closed position on an end face of a bead (7) of the ampoule (9); and wherein the stopper and the sliding part are separate elements;

wherein in the closed position, the sliding part is moved downwardly relative to the closure cap;

wherein the sliding part acts on an upper surface of the flange of the stopper; and wherein the stopper is moveable from an open position with the flange being distant to the bead into the closed position with the flange in sealing contact with the bead;

wherein the stopper (5) does completely seal an inner side of the ampoule in its sealing position;

wherein the sliding part is not turnable relative to the closure cap;

wherein the sliding part in the closed position is latched against the cap (2);

wherein the wall of the closure cap (2) has openings for allowing vapor/gas to escape from the ampoule in order to perform a freeze-drying procedure and/or to have means to check by eye whether the stopper is within the cap or not.

2. The closure according to claim 1, wherein the sliding part (3) is guided on an inside of a cap wall of the closure cap (2).

3. The closure according to claim 1, wherein the sliding part (3) is guided on an outside with respect to a cap wall of the closure cap (2).

4. The closure according to claim 1, wherein the sliding part (3) engages over an upper edge of a cap wall in a U shape cross section.

5. The closure according to claim 1, wherein the closure cap (2) has a guide wail for the closure stopper (5) which is separate from a cap wall (23).

6. The closure according to claim 1, wherein a separate guide wall is formed as a cap neck (21).

7. The closure according to claim 1, wherein a cap neck (21) projects upwardly over an uppermost cap wall.

8. The closure according to claim 1, wherein a cap neck wall is set back radially inwardly with respect to a cap wall.

9. The closure according to claim 1, wherein a passage opening is formed between a guide wall and a cap wall.

10. The closure according to claim 1, wherein the sliding part has the pushing projection (10) which protrudes into a passage opening(48).

11. The closure according to claim 1, wherein the closure stopper has a central region (12), having a smaller diameter, which extends upwardly from the flange (11).

12. The closure according to claim 1, wherein a central region (12) interacts with a guide wall.

13. The closure according to claim 1, wherein the sliding part engages over an uppermost top of the closure cap (2).

14. The closure according to claim 1, wherein the closure cap (2) or the sliding part (3) is coverable by a lid part (4).

15. The closure according to claim 1, wherein a lid part (4) is joined in one piece to the sliding part (3).

16. The closure according to claim 1, wherein the sliding part is made of hard plastic, and the closure stopper is made of rubber or soft plastic or thermoplastic elastomer.

17. The closure according to claim 1, wherein the closure cap combined with the stopper is mounted on the ampoule and only thereafter the sliding part is inserted to form a combination on the ampoule.

18. The closure according to claim 1, wherein the closure cap combined with the stopper forms a first combination mountable on the ampoule and only after the first combination is formed is the sliding part insertable to form a second combination for closing the ampoule.

19. The closure according to claim 1, wherein first the closure cap is placed on the ampoule and then the already combined stopper and sliding part is combined with the closure cap on the ampoule.

20. The closure according to claim 1, wherein first the closure cap is mountable on the ampoule and then the already combined stopper and sliding part is combinable with the closure cap on the ampoule.

21. A method for carrying out a freeze-drying process for a medium, or for a medicament, accommodated in an ampoule (9), comprising closing the ampoule (9) by means of a closure stopper (5) which seals in a region of an ampoule opening, with the flange in sealing contact with a bead (7), in addition the closure stopper (5) being initially held in a closure cap (2), mounted on the ampoule (9) before starting a drying, in a position at a distance from the region, and being moved into a sealing position after the drying is completed, wherein after the drying is completed, the closure stopper (5) is moved into a closed position by action of a sliding part (3), with the closure cap (2) stationary relative to the ampoule, that is displaceably guided on the closure cap (2);

wherein the closure stopper has a flange (11), and an insertion portion which extends downwardly from the flange;

wherein the sliding part acts on the flange (11) by means of a pushing projection (10);

wherein the pushing projection (10) is formed on the sliding part, and wherein the flange (11) rests in the closed position on an end face of the bead (7) of the ampoule (9); and wherein the stopper and the sliding part are separate elements;

wherein in the closed position, the sliding part is moved downwardly relative to the closure cap;

wherein the sliding part acts on an Upper surface of the flange of the stopper; and wherein the stopper is moveable from an open position with the flange being distant to the bead into the closed position with the flange in sealing contact with the bead; and wherein the stopper (5) does completely seal an inner side of the ampoule in its sealing position;

wherein the sliding part is not turnable relative to the closure cap;

wherein the sliding part in the closed position is latched against the closure cap (2);

wherein the wall of the closure cap (2) has openings for allowing vapor/gas to escape from the ampoule in order to perform the freeze-drying process and/or to have means to check by eye whether the stopper is within the cap or not.

22. The method according to claim 21, wherein the closure cap combined with the stopper is mounted on the ampoule and only thereafter the sliding part is inserted to form a combination on the ampoule.

23. The method according to claim 21, wherein the closure cap is combined with the stopper to form a first combination and only after the first combination is formed is the sliding part insertable to form a second combination for closing the ampoule.

24. The method according to claim 21, wherein first the closure cap is placed on the ampoule and then the already combined stopper and sliding part is combined with the closure cap on the ampoule.

25. The method according to claim 21, wherein first the closure cap is mountable on the ampoule and then the already combined stopper and sliding part is combinable with the closure cap on the ampoule.

* * * * *